(12) United States Patent
Guenter

(10) Patent No.: US 7,425,959 B2
(45) Date of Patent: Sep. 16, 2008

(54) REPRESENTATION OF IMPLICIT CURVES FOR PROCEDURAL SURFACES

(75) Inventor: Brian K. Guenter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 10/977,731

(22) Filed: Oct. 28, 2004

(65) Prior Publication Data

US 2006/0095489 A1   May 4, 2006

(51) Int. Cl.
    *G06T 11/20* (2006.01)
(52) U.S. Cl. ............................................. 345/442
(58) Field of Classification Search ................. 345/442
    See application file for complete search history.

(56) References Cited

U.S. PATENT DOCUMENTS

| | | | |
|---|---|---|---|
| 6,100,893 A | 8/2000 | Ensz et al. | |
| 6,285,372 B1 | 9/2001 | Cowsar et al. | |
| 6,300,958 B1 | 10/2001 | Mallet | |
| 6,356,263 B2 | 3/2002 | Migdal et al. | |
| 6,525,727 B1 | 2/2003 | Junkins et al. | |
| 6,806,875 B2 | 10/2004 | Nakatsuka et al. | |
| 2002/0171643 A1 | 11/2002 | Ernst et al. | |
| 2003/0174133 A1 | 9/2003 | Shehane et al. | |
| 2004/0114794 A1 | 6/2004 | Vlasic et al. | |
| 2004/0263516 A1 | 12/2004 | Michaili et al. | |

FOREIGN PATENT DOCUMENTS

KR  2005-44964 A  5/2005
WO  WO 2004-044689 A2  5/2004

OTHER PUBLICATIONS

Argyros, Ioannis. "On the comparison of weak variant of the Newton-Kantorovich and Miranda theorems". Jouranl of Computational and Applied Mathematics. vol. 166, Issue 2, Apr. 15, 2004, pp. 585-589.*
Argyros, Ioannis. "On the Newton-Kantorovich hypothesis for solving equations". Jouranl of Computational and Applied Mathematics. vol. 169, Issue 2, Aug. 15, 2004, pp. 315-332.*

(Continued)

*Primary Examiner*—Ulka Chauhan
*Assistant Examiner*—Jeffrey J Chow
(74) *Attorney, Agent, or Firm*—Klarquist Sparkman, LLP

(57) ABSTRACT

Compact and accurate piecewise parametric representations of implicit functions may be achieved by iteratively selecting ranges of parameterizing regions and testing each for satisfying an intervalized super convergence test. In one aspect, the implicit function is represented as a compact form of one or more representations of such convergence regions. In yet another aspect, iteration is begun with applying the intervalized convergence test to an entire pameterization region. In yet another aspect, the range being tested for super convergence is iteratively sub-divided to generate other ranges for testing. In one aspect, such sub-dividing comprises dividing the selected ranges by half. In one further aspect, Newton iterate steps are applied to selected ranges to change such ranges for further testing of super convergence of such ranges. Parametric representations that use such representations of convergence regions to express implicit functions consume far less memory for storage than conventional representations. Algorithms are described herein for quickly calculating such representations.

15 Claims, 12 Drawing Sheets

OTHER PUBLICATIONS

Dennis, Jr., J. E. "On the Kantorovich Hypothesis for Netwon's Method". Siam J. Numer. vol. 6, No. 3. Sep. 1969. pp. 493-507.*

Gutierrez et al. "Newton's Method Under Weak Kantorovich Conditions". IMA Journal of Numerical Analysis. vol. 20. 2000. pp. 521-532.*

Hernandez, M. A. "A Modification of the Classical Kantorovich Conditions for Newton's Method". Journal of Computational and Applied Mathematics. vol. 137. 2001. pp. 201-205.*

Kramer, Henry P. "The Iterative Determination of Model Parameters by Newton's Method". General Electric Company. Sep. 1967. pp. 1-12.*

Matthews, John H. "Module for Fixed Point Iteration and Newton's Method in 2D and 3D", http://math.fullerton.edu/mathews/n2003/FixPointNewtonMod.html. Mar. 14, 2004.*

Nataraj et al. "A New Super-Convergent Inclusion Function Form and its Use in Global Optimization". pp. 1-9.*

Wiethoff, Andreas. "Interval Newton Method". http://rz.uni-karlsruhe.de/~iam/html/language/cxsc/node12.html. Mar. 29, 1995.*

Wikipedia. "Invertible Matrix". http://en.wikipedia.org/wiki/Singular_matrix. Jul. 31, 2004.*

Zlepko et al. "An Application of a Modification of the Newton-Kantorovich Method to the Approximate Construction of Implicit Functions". Ukrainskii Matematicheskii Zhurnal. vol. 30, No. 2. Mar.-Apr. 1978. pp. 222-226.*

Bühler, "Rendering: Implicit Linear Interval Estimations", *Proceedings Of The 18th Spring Conference On Computer Graphics*, Apr. 24-27, 2002, Budmerice, Slovakia.

Duff, "Interval Arithmetic Recursive Subdivision for Implicit Functions and Constructive Solid Geometry", *ACM Siggraph Computer Graphics, Proceedings of the 19th Annual Conference on Computer Graphics and Interactive Techniques*, vol. 26, Issue 2, p. 131-138, Jul. 1992.

Gottschalk et al., "OBBTree: A Hierarchical Structure For Rapid Interference Detection", *Proceedings Of The 23rd Annual Conference On Computer Graphics And Interactive Techniques*, 1996.

Krishnan et al., An Efficient Surface Intersection Algorithm Based On Lower-Dimensional Formulation, *ACM Transactions On Graphics (TOG)*, vol. 16, Issue 1, Jan. 1997.

Ponamgi et al., "Incremental Algorithms for Collision Detection Between Solid Models", *Proceedings of The Third ACM Symposium On Solid Modeling And Applications*, p. 293-304, May 17-19, 1995, Salt Lake City, Utah, United States.

Snyder et al., "Generative Modeling: A Symbolic System for Geometric Modeling", California Institute of Technology from *Proceedings of SIGGRAPH 1992*, Association for Computing Machinery Special Interest Group on Computer Graphics (ACM SIGGRAPH), vol. 26, Issue 2, Jul. 1992, p. 369-378.

Snyder et al., "Interval Methods For Multi-Point Collisions Between Time-Dependent Curved Surfaces", *Proceedings Of The 20th Annual Conference On Computer Graphics And Interactive Techniques*, p. 321-334, Sep. 1993.

Snyder, "Interval Analysis for Computer Graphics", *ACM SIGGRAPH Computer Graphics, Proceedings of the 19th Annual Conference on Computer Graphics and Interactive Techniques*, vol. 26, Issue 2, Jul. 1992.

International Search Report from PCT/US2006/032227 dated Dec. 28, 2006, 3 pages.

Dennis, "On the Kantorovich Hypothesis for Netwon's Method," Siam J. Numer. Anal., vol. 6, No. 3, Sep. 1969, pp. 493-507.

International Search Report from PCT/US06/25413 dated Feb. 15, 2007, 7 pages.

Bartels et al., "An introduction to splines for use in computer graphics & geometric modeling," Chapter 3, Hermite and Cubic Spline Interpolation, San Francisco, CA, Morgan Kaufmann, pp. 9-17, 1998.

Sederberg et al., "Geometric hermite approximation of surface patch intersection curves," Computer Aided Geometric Design 8:97-114, 1991.

* cited by examiner

```
bool ConvergenceInRegion(x̄_o)  ~~ 1010                          1000
    input : starting point (x̄_o) = (x̄_p, xd)

if convergence (x̄_o) return true  ~~ 1020
    else
        // subdivide x̄_p
        x̄_p low = (x̄_p, x̄_p.mid)    x̄_p high = (x̄_p.mid, x̄_p)  ~~ 1030
        // compute new starting points using Interval Newton start low = Interval Newton (x̄_p low.mid)

start high = Interval Newton (x̄_p high.mid)  ~~ 1040 x̄_o low = (x̄_p low, start low)
                                                              1050
            x̄_o high = (x̄_p high, start high)

return ConvergenceInRegion(x̄_o low) && ConvergenceInRegion(x̄_o high)
```

FIG. 10

```
bool convergence (x̄_o = (x̄_p, x_d))
    x̄_i = x̄_o
    while (x̄_i are shrinking) {                    ~~ 1110
        h̄_i = D⁻¹_D f(x̄_i) f(x̄_i)
        x̄_{i+1} = x̄_i - h̄_i
        U = expand (x_{i+1}, h_i)
        M = Lipshitz Constant (U)
        if | f(x̄_i) 1 1 D⁻¹ f(x̄_i) | M < 1/2      ~~ 1120
            return true;
} //didn't prove convergence so have to subdivide
  //subdivide region but keep same starting point x_d
    x̄ low = ([x̄_p, x̄_p.mid], x_d)
                                                    ← 1130
    x̄ high = ([x̄_p.mid, x̄_p], x_d)
    return convergence (x̄ low) && convergence (x̄ high)   ~~ 1140
```

REPRESENTATION OF IMPLICIT CURVES FOR PROCEDURAL SURFACES

TECHNICAL FIELD

The technical field relates to modeling of graphical objects in computers. More particularly, the field relates to modeling implicit curves of intersection of procedural objects.

BACKGROUND

Surface representations in computer graphics can be orders of magnitude smaller than polygonal or patch based surface representations which may be a desirable feature for memory constrained devices like game consoles. Constructive Solid Geometry (CSG) operations are a powerful method for defining surfaces of high genus (e.g. a sphere with a hole) from surfaces of low genus, such as plain cylinders and spheres. Defining parametric procedural surfaces of genus 0 (e.g., a sphere) and some surfaces of genus 1 (e.g., a torus) is usually straightforward since there are no holes in the surface domain. However, for surfaces of higher genus, it is much more difficult since domains of some parametric surfaces may have holes whose boundaries are, in some sense, only implicitly defined (e.g., as an intersection of surfaces). These boundaries are difficult to program manually.

CSG operations may provide methods for defining surfaces of high genus from surfaces of low genus, such as cylinders and spheres. Virtually any manufactured object may be modeled using CSG operations in combination with surfaces of revolution and generalized extrusions, both of which are easily programmed procedurally. Also, the addition of CSG operations to procedural surfaces dramatically increases the scope of objects that can be modeled procedurally.

Among other things, CSG operations may require computing and representing curves of intersection between the two or more surfaces being operated upon. These curves, in general, are defined only implicitly as the solution to an equation of the form $f(x_1, \ldots, x_n)=0$. These equations are not easy to evaluate and typically require a sophisticated, slow, and computationally costly global zero finding solver. A more compact, exact and resolution independent representation of such curves on the other hand may be efficiently evaluated at runtime on a graphics processor. Such representation may be a highly desirable feature for memory constrained devices, like game consoles or for bandwidth constrained applications. Also, such representations may make it possible to represent high genus surfaces in an entirely procedural way without significant computational costs.

SUMMARY

Described herein are methods and systems for accurately generating compact piecewise parametric representations of implicit functions. In one aspect, the implicit functions may be implicit curves of intersection between at least two procedural surfaces of graphical objects.

In another aspect, an intervalized version of the implicit function theorem may be applied to determine whether it is possible parameterize one or more of the domain variables of an implicit function in terms of one more of parameterizing variables of the domain. In one aspect, the possibility of such parameterization is guaranteed by determining the non-singularity of one or more dependent derivative matrices corresponding to one or more domain variables selected for parameterization.

In yet another aspect, the domain may be divided into parameterization regions comprising ranges of values of parameterization variables. Different parameterization regions may have different parameterizing variables associated therewith.

In one aspect, an intervalized super convergence test comprising applying a Kantorovich condition may be applied to selected parameterization ranges in order to determine whether the dependent variables associated therewith converge to a solution. Such ranges may be designated as convergence regions used to generate a compact and accurate representation of the implicit function.

In yet another aspect, if upon not meeting the intervalized super convergence test for a first selected range, further ranges may be selected by iteratively subdividing the ranges for a selected number of times or until the super convergence test is satisfied. In one aspect, such sub-dividing may comprise dividing by half. In another aspect, the intervalized super convergence test may be reapplied to selected ranges with different starting points. In one aspect, such starting points may initially be the middle point of the selected ranges.

In a further aspect, the process of determining convergence regions may be accelerated by implementing steps comprising applying Newton iterations to the selected ranges and changing such ranges for further application of the super convergence tests. In one aspect, the Newton steps may be iteratively applied so long as the ranges being tested for super convergence continue to shrink.

Additional features and advantages will become apparent from the following detailed description of illustrated embodiments, which proceeds with reference to accompanying drawings.

BRIEF DESCRIPTION OF THE FIGURES

FIG. 10 is a listing describing an algorithm for determining convergence regions based on applying a super convergence test to iteratively sub-divided portions of one or more parameterization regions.

FIG. 11 is a listing describing an exemplary algorithm comprising a super convergence test iteratively applied to determine convergence regions.

DETAILED DESCRIPTION

Figure 1:
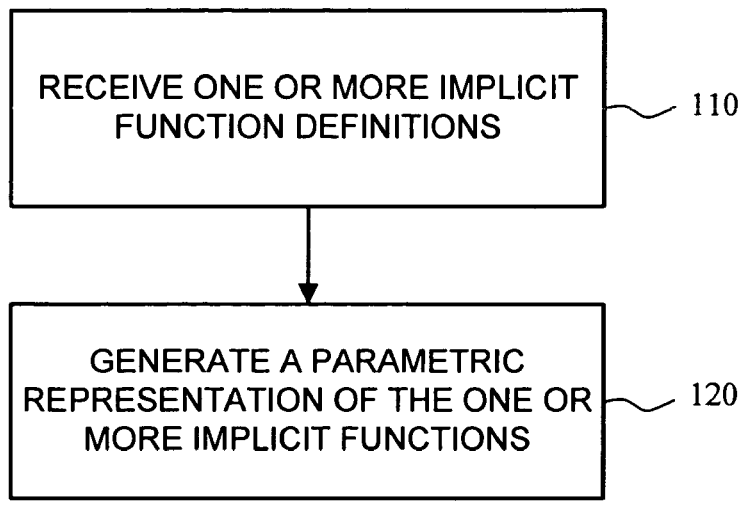
FIG. 1 is a flow diagram describing exemplary overall methods for generating parametric representations of implicit functions.

Exemplary Overall Methods for Generating Representations of Implicit Functions FIG. 1 illustrates an exemplary method for generating representations of functions that are defined implicitly. According to this exemplary method, at 110, definitions of one or more implicit functions are received and at 120, one or more parametric representations corresponding to the one or more implicit functions are generated. Among other things, such parametric representations allow for expressing implicit functions in an efficient manner. Alternative implementations of implicit function representation generating methods can include fewer or more operations.

Exemplary Implicit Curves of Intersection

Figure 2:
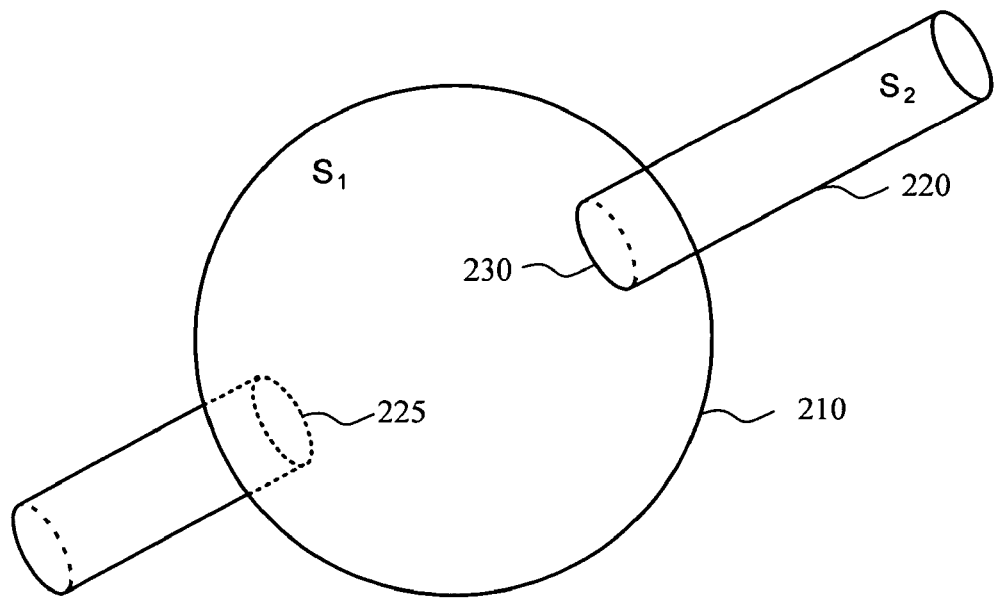
FIG. 2 is a block diagram illustrating exemplary implicit curves of intersection generated by the intersection of two exemplary procedural objects.

FIG. 2 illustrates an exemplary implicit function representation. As shown in FIG. 2, an exemplary sphere surface $S_1$ at 210 intersects an exemplary cylinder surface $S_2$ at 220 to form curves of intersection at 225 and 230. The function defining the curves 225 and 230 can be defined implicitly as an intersection of the primitive types, the sphere surface $S_1$ 210 and the cylinder surface $S_2$ at 220. For instance, if the sphere surface $S_1$ is a function $f_1(u_0, u_1)$ and the cylinder is represented by some function $f_2(u_2, u_3)$ then the intersection of the two surfaces are implicitly represented as some function $F=f_1(u_0, u_1)-f_2(u_2, u_3)=0$. Thus, since the primitives $S_1$ at 210 and $S_2$ at 220 are defined procedurally in terms of some parameters $(u_0, u_1)$ and $(u_2, u_3)$, respectively, function F $(u_0, u_1, u_2, u_3)$ can also be defined procedurally. Once such curves are defined procedurally they can be manipulated much more easily by a Graphics Processing Unit (GPU) for accomplishing animation, for instance. Identifying the intersection and representing the intersection are typically computationally expensive, however, and may also consume large amounts of memory for storage. However, it is possible to generate parametric representations of such implicit curves that are exact, compact, resolution independent and easily evaluated at runtime in a procedural way.

Exemplary Parametric Representations

Given the procedural function F $(u_0, u_1, u_2, u_3)$ as described above where $F(\bar{x})$ is such that $(\bar{x})$ is a range of values of the domain variables $(u_0, u_1, u_2, u_3)$ and suppose there is a function FP $(\bar{x}_p) = \bar{x}_d$ such that $\bar{x}_p$ and $\bar{x}_d$ partition the domain $\bar{x}$ into parameterizing variables (also known as independent variables) and dependent variables, respectively. If the $F(\bar{x})$ is such that F: $R^m \rightarrow R^n$, then m-n may denote the number of parameterizing variables in a transformation. Thus, the function FP $(\bar{x}_p)$ allows for the dependent variables $\bar{x}_d$ to be expressed in terms of the independent or parameterizing variables $\bar{x}_p$. The actual number of m variables compared to n variables in a function $F:R^m \rightarrow R^n$ can vary. For instance, a 4→3 transformation is one typical transformation in CSG. The ability to parameterize an implicit function has the immediate advantage of reducing the memory needed to store a representation of such a function.

Exemplary Methods for Determining Parameterization

It may not be always possible to parameterize an implicit function. More particularly, not every variable of an implicit function can be used in an expression as a parameterizing variable to express other variables of the function. One way to prove the possibility of a parameterization by any of the domain variables of an implicit function is to apply a simple form of the implicit function theorem to determine which of the various dependent derivative matrices of such a function approach non-singularity. For instance, in the example above, wherein F is such that $F:R^4 \rightarrow R^3$ with 4 domain variables and 3 range variables and $F(u_0, u_1, u_2, u_3) = F(f_x, f_y, f_z)$ will yield a derivative matrix as follows:

$$\begin{array}{cccc} \frac{\partial f_x}{\partial u_0} & \frac{\partial f_x}{\partial u_1} & \frac{\partial f_x}{\partial u_2} & \frac{\partial f_x}{\partial u_3} \\ \frac{\partial f_y}{\partial u_0} & \frac{\partial f_y}{\partial u_1} & \frac{\partial f_y}{\partial u_2} & \frac{\partial f_y}{\partial u_3} \\ \frac{\partial f_z}{\partial u_0} & \frac{\partial f_z}{\partial u_1} & \frac{\partial f_z}{\partial u_2} & \frac{\partial f_z}{\partial u_3} \end{array}$$

Suppose a dependent derivative matrix with $u_0$ as the independent variable is as follows:

$$\begin{array}{ccc} \frac{\partial f_x}{\partial u_1} & \frac{\partial f_x}{\partial u_2} & \frac{\partial f_x}{\partial u_3} \\ \frac{\partial f_y}{\partial u_1} & \frac{\partial f_y}{\partial u_2} & \frac{\partial f_y}{\partial u_3} \\ \frac{\partial f_z}{\partial u_1} & \frac{\partial f_z}{\partial u_2} & \frac{\partial f_z}{\partial u_3} \end{array}$$

Figure 3:
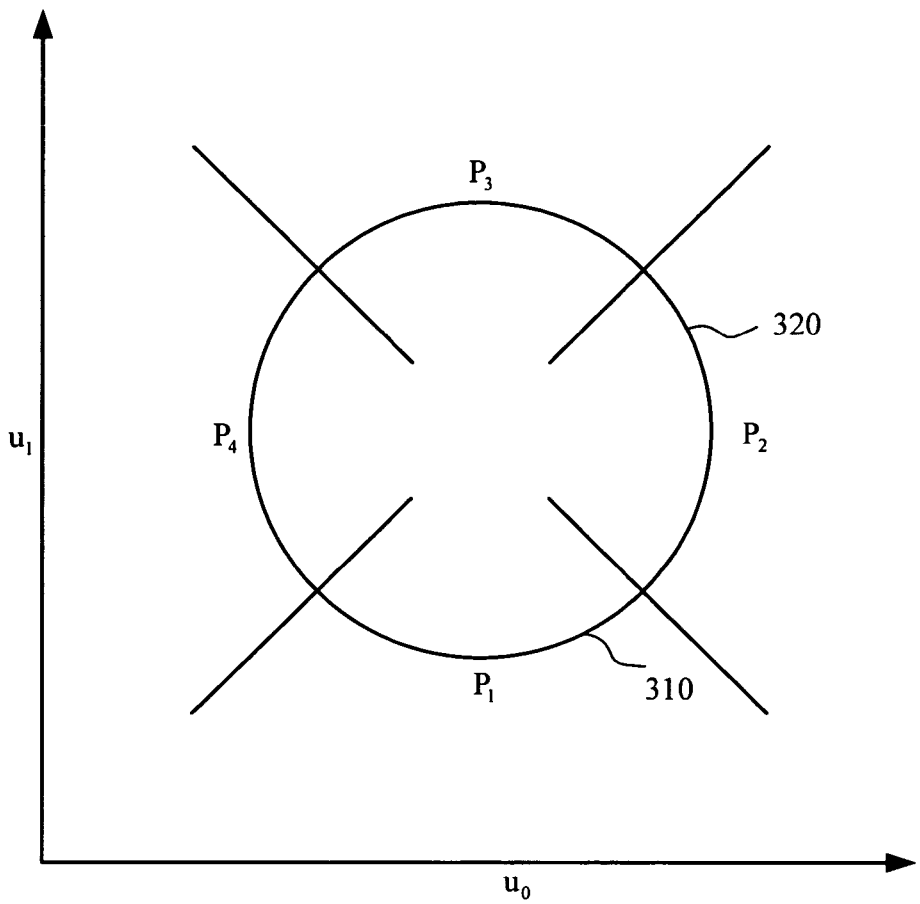
FIG. 3 is a block diagram illustrating exemplary partitioning of a domain for determining parameterizing variables.

According to a simple form of the implicit function theorem, if the above dependent derivative matrix is non-singular such that no one column of the matrix can be expressed as a weighted sum of the others then the implicit function can be expressed in a parametric form with $u_0$ in this instance as the parameterizing variable. Dependent derivative matrices based on the other variables may also be non-singular and thus indicate the possibility of parameterization of the function based on these other variables such that these other variables may also serve as parameterizing variables. However, there may be advantages in selecting one variable as the parameterzing variable over others to parameterize different parts of a curve. As shown in FIG. 3, for instance, within a 2D domain such as $(u_0, u_1)$ parameterization regions can be selected based on non-singularity property of the relevant dependent derivative matrices. In FIG. 3, at 310 ($P_1$), it may be better to choose $u_0$ as the parameterizing variable, whereas at 320 ($P_2$) $u_1$ may be a better choice. This is at least partially dependent on the fact that within the region 310 ($P_1$) a small change in $u_1$ may lead to a large change in $u_0$ whereas in the other direction, large changes in $u_0$ lead to smaller changes in $u_1$. The same principle can confirm the choice of $u_1$ as the parameterizing variable within the $P_2$ region. The same holds true for regions $P_3$ and $P_4$ having parameterizing variable choices of $u_0$ and $u_1$ respectively. Also, the 2D parameterization regions shown in FIG. 3 are merely illustrative. The same principle holds true for domains with higher dimensionalities, as well.

Exemplary Overall Methods for Representing Implicit Curves

Figure 4A:
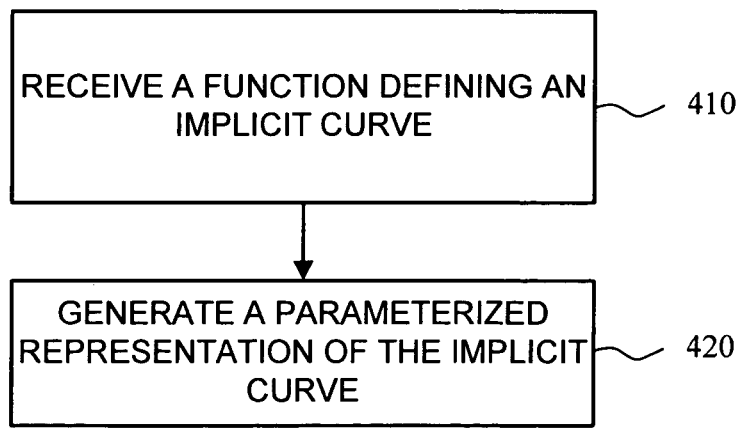
FIG. 4A is a flow diagram describing exemplary overall methods for generating parametric representations of implicit curves.

Thus, based on determining the possibility of parameterization of implicit curve functions and selecting parameterization regions and their corresponding parameterizing variables, as described above, a parameterized representation of an implicit curve can be calculated. FIG. 4A illustrates one such exemplary overall method for calculating parameterized representations of an implicit curve. As shown in FIG. 4A, at 410, a function defining an implicit curve is received, and at 420, a parameterized representation of the implicit curve is generated based on parameterizing the implicit curve function. Alternative implementations of this exemplary method may optionally omit the operations 410 and 420 or include additional operations.

Figure 4B:
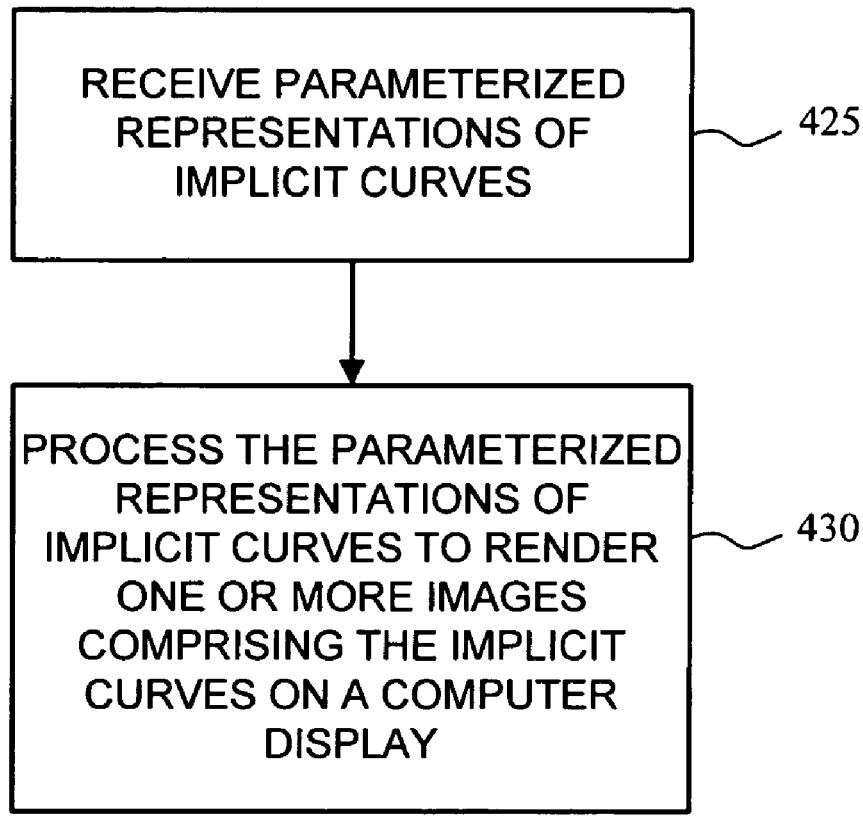
FIG. 4B is a flow diagram describing exemplary overall methods for processing parametric representations of implicit curves to render images comprising implicit curves on a computer display.

Exemplary Methods for Processing Parameterized Implicit Curve Representations FIG. 4B illustrates exemplary methods for processing parameterized implicit curve representations by a GPU, for instance. According to this method, at 425, the GPU receives a parameterized representation of an implicit curve, generated, for instance, as shown in FIG. 4A. At 430, the GPU processes the parameterized representations of the implicit curve to render an image comprising the implicit curves described by the parameterized representation thereof. Alternative implementations of this exemplary method may optionally omit the operations 425 and 430 or include additional operations.

Among other things, a compact representation of implicit curves reduces the computational costs of processing needed by the GPU to render images comprising implicit curves. Thus, compact representations of implicit curves allow the GPU to process more image data at runtime to render a more rich set of images on a computer display.

Figure 4C:
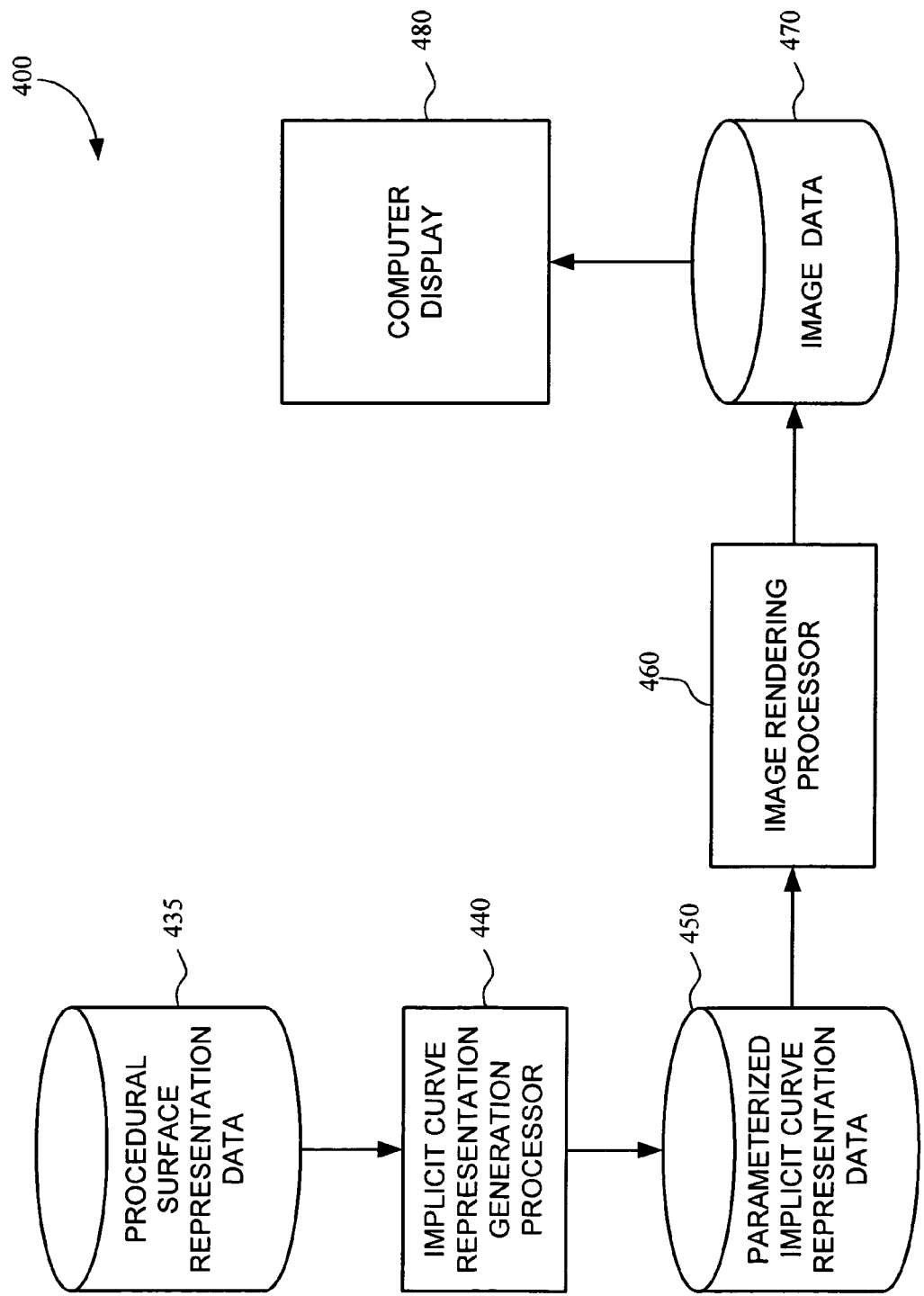
FIG. 4C is a block diagram describing an exemplary system for generating and processing parameterized representations of implicit curves to render images comprising implicit curves on a computer display.

An Exemplary System for Generating and Processing Parameterized Implicit Curve Representations FIG. 4C illustrates an exemplary system 400 for generating and processing parameterized representation of an implicit curve. The system comprises an implicit curve representation generation processor 440, which receives data related to procedural surface representations of one or more graphical objects 435 and generates data 450 related to one or more parameterized representations of implicit curves formed based on the procedural representations of one or more graphical objects 435. For instance, the implicit curve representation generation processor 440 can use the methods of FIG. 4A to generate the data 450 related to one or more parameterized representations of implicit curves.

The image rendering processor 460 receives the data 450 related to one or more parameterized representations of implicit curves and processes the data 450 to generate image data 470 for displaying images comprising the implicit curves on the computer display 480. For instance, the image rendering processor 460 may be a GPU programmed for transforming the parameterized representations of the implicit curves through tessellation methods for generating polygon-based representations of implicit curves for displaying the implicit curves along with other image components on a computer screen 480.

Figure 5A:
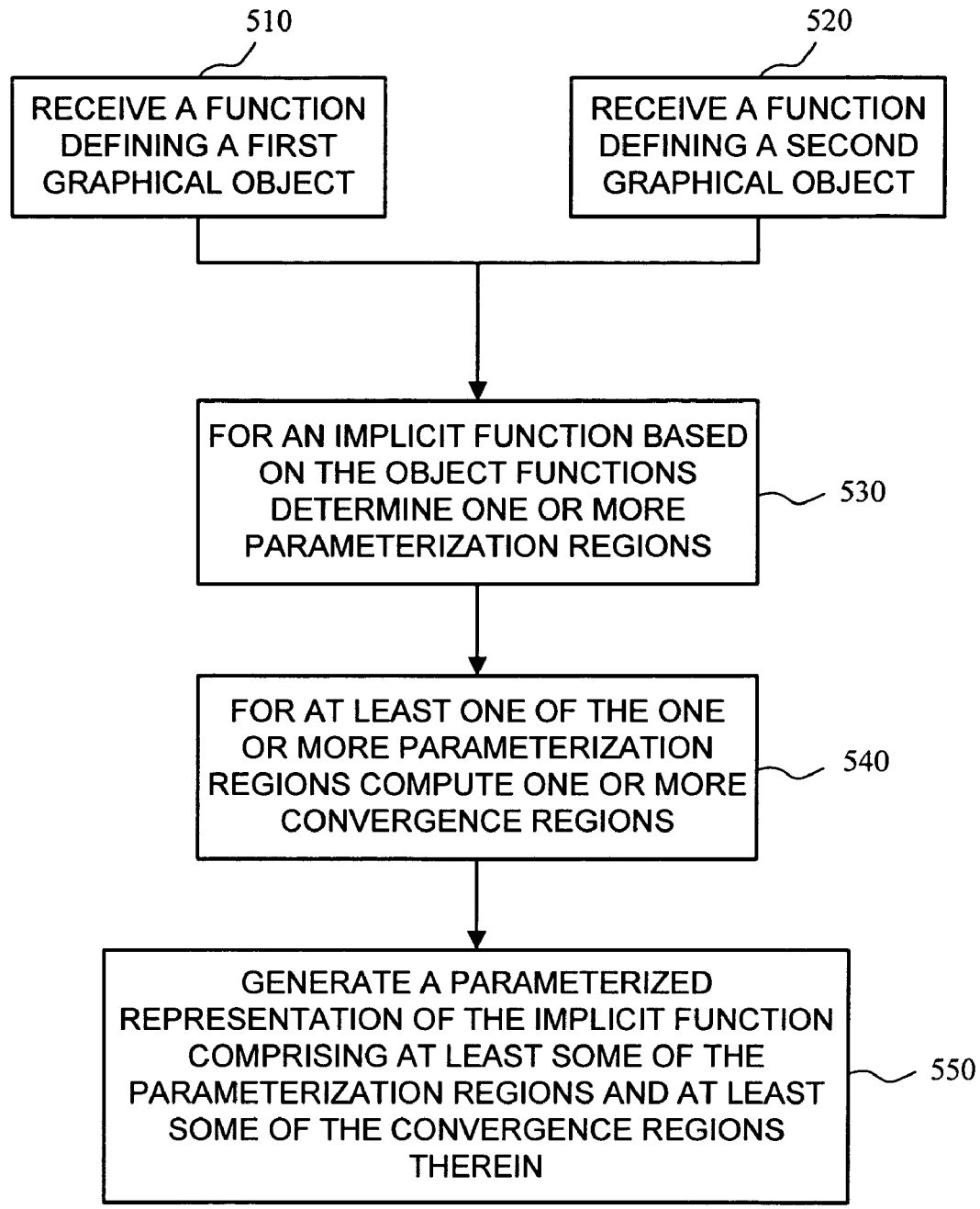
FIG. 5A is a flow diagram describing exemplary overall methods for generating parametric representations of implicit curve functions comprising convergence regions.

Exemplary Methods for Generating Parameterized Representations of Implicit Curves Comprising Determining Convergence Regions FIG. 5A illustrates a more detailed description of methods of calculating a parameterized representation of an implicit curve (e.g., 225 and 230 of FIG. 2). For instance, the implicit curve representation generation processor 440 in FIG. 4C can be programmed to implement the methods described below. According to this method, at 510, a function defining a first object (e.g., $S_1$ at 210) is received and at 520, a function defining a second object (e.g., $S_2$ at 220) is received. Then at 530, for an implicit curve function defined at least partially based on some operation on the functions of the first and the second objects (e.g., $f_1(u_0, u_1) - f_2(u_2, u_3) = 0$ defining a curve of intersection of procedural surfaces $S_1$ and $S_2$) parameterizing regions are first determined (e.g., as shown above with reference to FIG. 3).

The implicit function theorem relying on the non-singularity property of the appropriate dependent derivative matrices confirms that parameterization of dependent variables using the parameterizing variables is possible. Thus, solving for a range of values of the parameterizing variables over which parameterization of the dependent variables is possible based on the non-singularity of the relevant dependent derivative matrices yields parameterization regions. However, further calculations are needed to solve for dependent variable values that yield $f_1(u_0, u_1) - f_2(u_2, u_3) = 0$ for determining the implicit curve described above over a range of the parameterizing variable. Such a range of the parameterizing variable may be referred to as a convergence region.

For instance, if we have a parameterization region $u_i$ such that there is some function $g(u_i) = u_d$ wherein $u_d$ is a 3 vector of functions that define the dependent variables in terms of scalar parameterizing variable $u_i$. In that case, $g(u_i)$ would be a parametric form of some implicit curve function, such as $F_{csg}(u_0, u_1, u_2, u_3) = f_1(u_0, u_1) - f_2(u_2, u_3) = 0$. Suppose one can use the notation $u = [u_{ic}, u_d]$ to indicate a 4 vector point consisting of the scalar $u_{ic}$ then $F_{csg}(u_{ic}, u_{dc}) = 0$ can represent the implicit curve of intersection.

In that case, given the parameterizing region $\overline{u_{ic}}$, in order to solve for a point on the curve corresponding to the parameter value $u_{ic}$, such that $F_{csg}(u_{ic}, u_{dc}) = 0$, we need to find the unique 3 vector $u_{dc}$ that satisfies $F_{csg}(u_{ic}, u_{dc}) = 0$. To do this one could use Interval Newton to solve this equation but it is orders of magnitude too slow for real time use. Conventional Newton iteration is faster and simpler, but in order to use it, two questions need answers: 1) what starting point, $[u_{ic}, u_s]$, should we use for a given $u_{ic}$ and 2) for what range of values $\overline{u_{ic}}$ can the Newton iteration be guaranteed to converge, starting from $[u_{ic} \in \overline{u_{ic}}, u_s]$ to the correct point on the curve?

Based on these answers, the parametric function $g(u_i)$ for one parametric region $\overline{u_i}$ can be constructed by partitioning $\overline{u_i}$ into intervals of guaranteed convergence $\overline{cr_k}$, each of which has an associated starting point $u_{sk}$. To compute a point ($u_{ic}$, $u_d$) on the curve first, find $\overline{cr}_k|u_{ic}\in\overline{cr}_k$. Then, use the 4 vector $[u_{ic},u_{sk}]$ as the starting point for the Newton iteration $u_{dj+1}=u_{dj}D^{-1}_{ui}(f(u_{ic},u_{dj}))f(u_{ic},u_{dj})$.

Figure 5B:
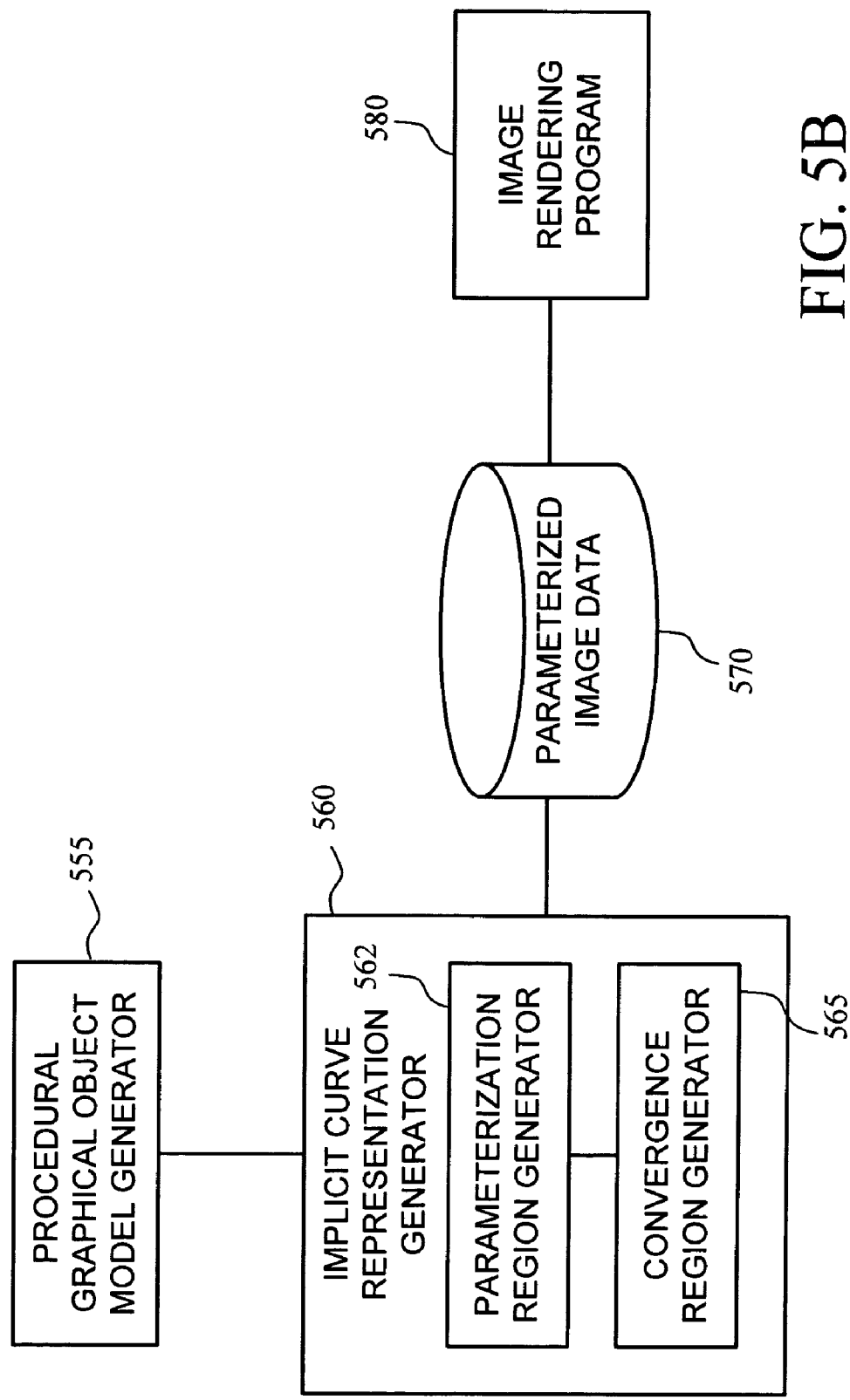
FIG. 5B is a block diagram describing a system for generating parametric representations of implicit curve functions comprising convergence regions.

In one example, the entire parameterization region may also be the convergence region. Alternatively, several convergence regions and several starting points corresponding to these convergence regions may comprise a parameterization region. For an efficient representation of an implicit curve function fewer the starting points and fewer the convergence regions, the better. As shown, at 540 in FIG. 5, one or more convergence regions are determined for at least one of the parameterization regions. Upon which, at 550, a parameterized representation of the implicit curve function is expressed in form of data representative of the parameterization regions and convergence regions therein.

As noted above, an implicit curve representation generation processor 440 in FIG. 4C can be programmed to implement the methods described with reference to FIG. 5A for generating parameterized representation of implicit curves. For instance, the implicit curve representation generation processor 440 is programmed to execute the instructions of an exemplary implicit curve representation generator module 560 in FIG. 5B for processing procedural graphical objects from a modeling program 555. Such an implicit curve representation generator module 560 comprises a parameterization region generator 562 for generating parameterizing regions and a convergence region generator 565 for determining convergence regions from the parameterizing regions for representing implicit curves. The parameterized representations of implicit curves are stored as parameterized image data 570, which can be processed by an image rendering program 580 to display the images on a computer display.

Exemplary Methods for Determining Convergence Regions

Figure 6:
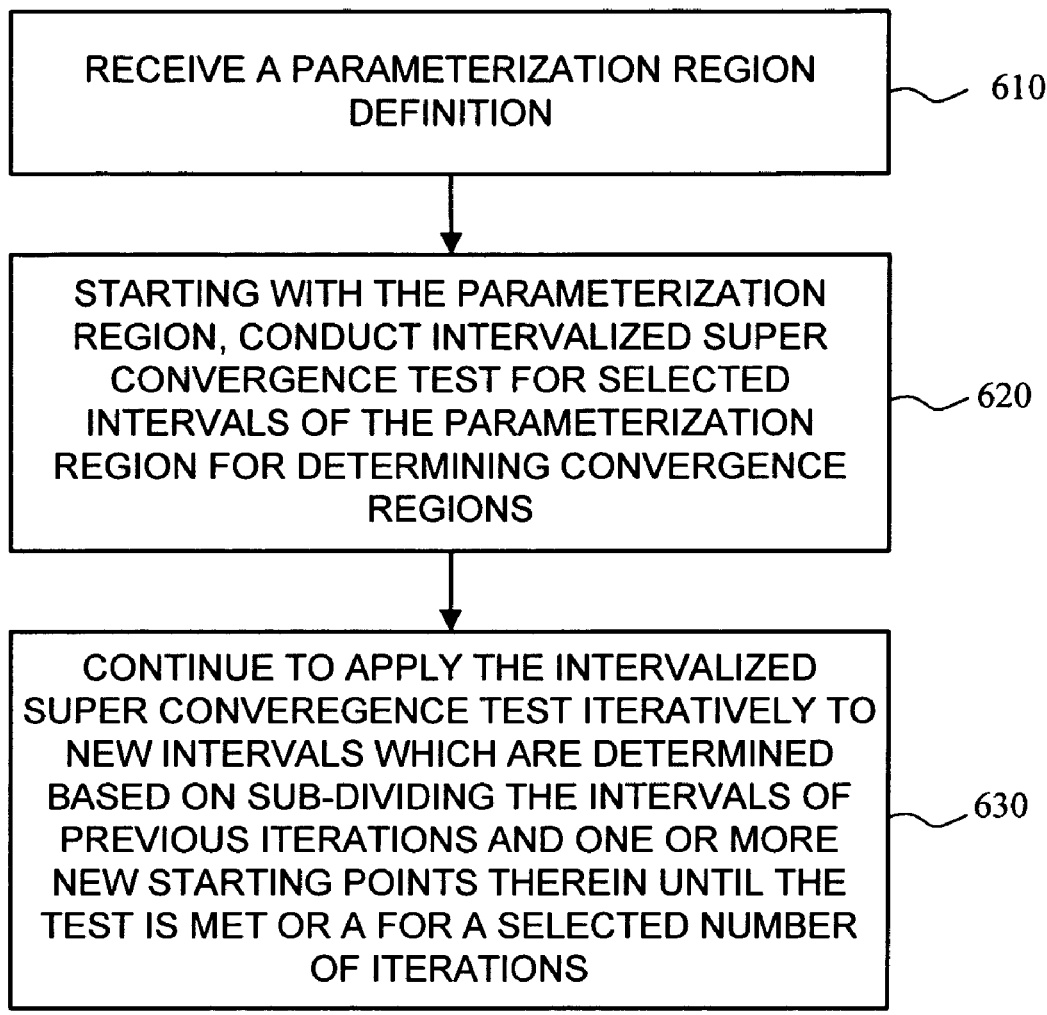
FIG. 6 is a flow diagram describing exemplary overall methods for determining convergence regions of selected parameterizing variables of an implicit function.

As noted above with respect to FIG. 5A, once parameterization regions are determined, ranges of values of parameterizing variables within the parameterization region are determined, which yield values of the dependent variables that converge to a single solution (e.g., 540 and 550). FIG. 6 illustrates one overall method for determining such convergence regions. At 610, a definition of a parameterization region is received. Then at 620, starting with the entire parameterization region and with one starting point chosen (e.g., middle of the range of values of the parameterization region) from within the parameterization region an intervalized super convergence test is conducted to determine whether the entire parameterization region converges.

An intervalized super convergence test comprises an interval extension to the simple single value form of the implicit function theorem. In general, an intervalized super convergence test is applied over an interval of values of a parametrizing variable, as opposed to a single value of the same.

Suppose, for instance, that the implicit function $F(u_0, u_1, u_2, u_3)=F(\overline{x})=0$ defines an implicit curve of intersection and there is a function $FP(\overline{x}_p)=\overline{x}_d$ such that $\overline{x}_p$ and $\overline{x}_d$ partition the domain $\overline{x}$ into parameterizing variables (also known as independent variables) and dependent variables, respectively. Then taking a starting point on the curve $\overline{x}_o=(\overline{x}_p, x_d)$ such that $x_d$ is a point value of independent variables and $\overline{x}_p$ is a range of parameterizing variables if Kantorovich's theorem holds true for the starting point of the curve then any value of the parameterizing variable within the range $\overline{x}_p$ converges to a solution of the implicit function. For instance, Kantorovich's theorem in this example may be stated as follows:

If $|f(\overline{x}_0)||D^{-1}f(\overline{x}_0)|^2 \, m<\frac{1}{2}$; where m is provided by the Lipschitz given by $|Df(u_0)-Df(u_1)|\leq m^*|u_0-u_1|$ for all $u_0$, and $u_1$ in U then a Newton Iteration stated as $x_{i+1}=x_i+|Df(x_i)|f(x_i)$ super converges to a unique solution.

Also, the condition $If|f(\overline{x}_0)||D^{-1}f(\overline{x}_0)|^2 \, m<\frac{1}{2}$ herein is referred to as Kantorovich condition. If Kantorovich condition equals to ½, that suggests a simple convergence. On the other hand, super convergence is reached if the same expression yields value $<\frac{1}{2}$. Thus, as shown above, an intervalized super convergence test applies the Kantorovich condition to a range of values.

Nevertheless, a conventional application of Kantorovich's theorem to a range of values yields convergence regions that are very small. This may be so because, in general, Kantorovich's theorem is very pessimistic. Also, the Kantorovich condition is not a necessary condition it is however a sufficient condition. Thus, if in a first iteration of the application of the super convergence test the Kantorovich condition does not hold true, then as shown at 630 in FIG. 6, the super convergence test including the Kantorovich condition can be applied iteratively based on new intervals of the parameterizing variables and new starting points.

In one embodiment, new intervals are generated by sub-dividing the parameterizing variable intervals of previous iterations until some maximum number of iterations or until one subdivision of the intervals converges. Also, in one embodiment such sub-dividing may be by half.

Also, in one embodiment, new starting points on the curve associated with the new intervals can be selected by identifying a middle point of the new interval of the parameterizing variable and the corresponding values of the dependent variables. The sub-dividing and identification of new starting points is continued until one combination of a range of parameterizing variables and an associated starting point therein is determined that meets the super convergence test.

Figure 7A:
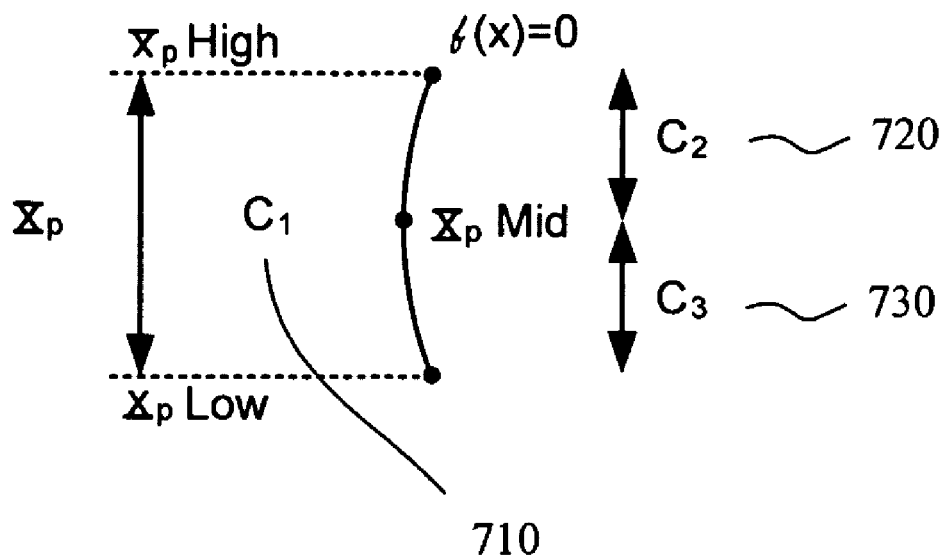
FIG. 7A is a block diagram for illustrating exemplary subdivisions of exemplary parameterization regions for determining convergence regions therein.
Figure 7B:
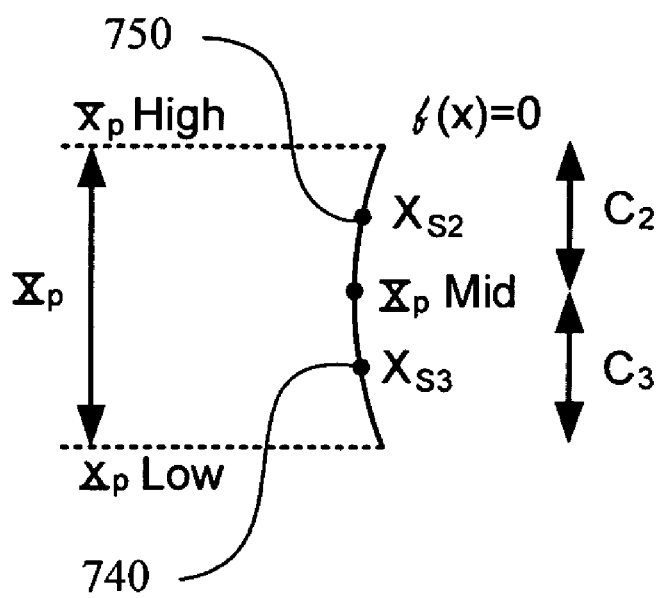
FIG. 7B is a block diagram for illustrating exemplary subdivisions of exemplary parameterization regions with different starting points identified for each new subdivision for determining the convergence regions.

FIG. 7A illustrates one exemplary subdivision of the parameterization region that can lead to a convergence region. For instance, the entire parameterization region $C_1$, at 710, is tested for super convergence, and if the test is not satisfied, the region $C_1$ is sub-divided further to regions $C_2$ 720 and $C_3$ 730 and each such region is further tested again for super convergence. Furthermore, as shown in FIG. 7B, newer starting points at $x_{s2}$ 750 and $x_{s3}$ 740 are calculated to conduct further testing for super convergence. These processes can be repeated until determining one combination of intervals that meet the super convergence test or until some maximum number of iterations.

An Accelerated Super Convergence Test for Determining Convergence Regions

Figure 8:
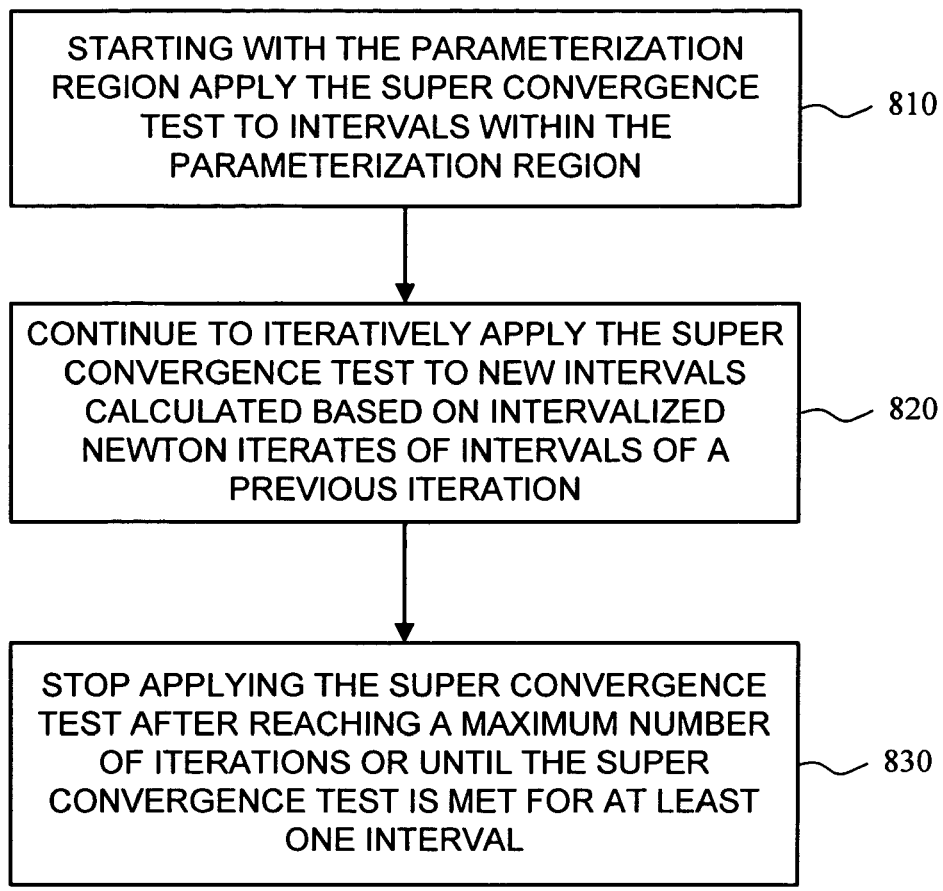
FIG. 8 is a flow diagram illustrating an exemplary method for determining convergence regions using iteratively applied Newton steps to selected ranges.

FIG. 8 illustrates an exemplary method for determining convergence regions comprising a technique for accelerating the process of determining convergence regions with selected subdivisions of the parameterization regions. At 810, super convergence test is applied to intervals within the parameterization regions. At 820, the super convergence test is reapplied to new intervals calculated, at least partially, based on intervalized Newton iterates of a previous iteration. The choice of Newton iterates further ensures that the range being evaluated is more likely to converge than a guess based on just simple subdivisions of the parameterization regions and selecting middle points of subdivisions as the starting points. Then, at 830, the process is continued for a maximum number of iterations or until super convergence test is met for some region being tested.

Figure 9:
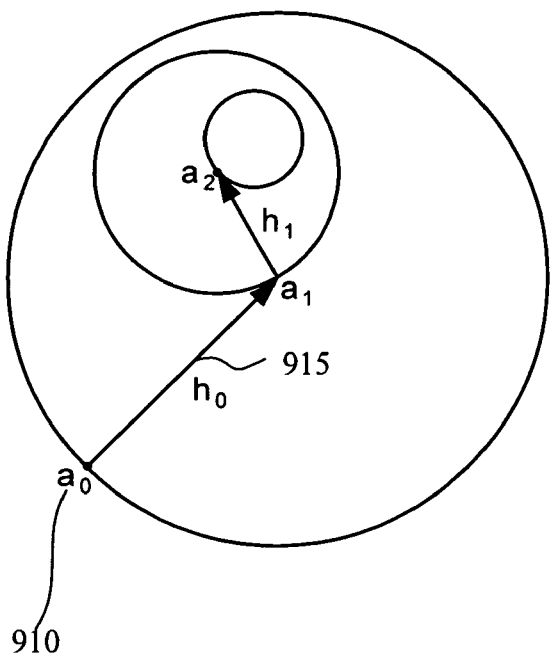
FIG. 9 is a block diagram illustrating the use of Newton steps for determining the convergence regions.

FIG. 9 illustrates the progressive Newton iterate steps, such as $h_0$ at 915, to determine new intervals with new starting points by starting at some point $a_0$ 910 and progressing until identifying regions meeting the super convergence test. Newton iterate steps (e.g., $h_0$) are provided by Newton iteration expression stated as follows:

$$\overline{x_{i+1}} = \overline{x_i} - \overline{h_i}$$

The regions that satisfy the convergence test are then used to represent a parameterized form of an implicit curve.

Exemplary Algorithms for Determining Convergence Regions

FIGS. 10 and 11 illustrate an algorithm for determining convergence regions by iteratively sub-dividing ranges of values of parameterization region and applying the super convergence test, as described with reference to FIGS. 6, 7 and 8. The implicit curve representation generation processor 440 of the system 400 for processing graphical data can be programmed to implement the methods described with reference to FIGS. 10 and 11 below. FIGS. 10 and 11 together illustrate two methods that are recursively called for a selected number of iterations or until a convergence region that satisfies the super convergence test is identified.

In one embodiment, as shown in FIG. 10, at 1010 the ConvergenceInRegion($\overline{x}_o$) method is called for a selected range of values $\overline{x}_o$ on the implicit curve for which convergence is being determined. For instance, the range of values $\overline{x}_o$ may be expressed as ($\overline{x}_p$, $\overline{x}_d$) which comprises a range of values of the parameterizing variables and a corresponding starting set of values for the dependent variables. Then at 1020, the recursive test for super convergence, which is referred to in this example as convergence($\overline{x}_o$) method (1100 in FIG. 11) is called. If at 1020, the convergence($\overline{x}_o$) (1100 at FIG. 11) method returns 'true', then the range of values $\overline{x}_p$ identified as the range of parameterizing values associated with $\overline{x}_o$ is determined to be the convergence region. A typical initial value for $\overline{x}_o = (\overline{x}_p, x_d)$ may be one where $\overline{x}_p$ is the entire parametrization region. However, other ranges of values of $\overline{x}_p$ and their corresponding values of dependent variables $\overline{x}_d$ may also be used. If at 1020, convergence($\overline{x}_o$) (1100) method returns false, then ranges of parameterizing variables $\overline{x}_p$ are iteratively sub-divided at 1030 and new starting points calculated for each region (e.g., $\overline{x}_{pLow}$ and $\overline{x}_{pHigh}$), at 1040, upon which, ConvergenceInRegion($\overline{x}_o$) method is recursively called at 1050 for a selected number of times or until the convergence regions are determined.

FIG. 11 illustrates an exemplary super convergence test for determining convergence regions. In one embodiment, the super convergence test comprises applying the Kantorovich condition iteratively to selected ranges of values on an implicit curve, wherein the range may be changed iteratively by a Newton iterate step. Thus, as shown in the exemplary super convergence test convergence($\overline{x}_o$), at 1110, while ($\overline{x}_i$ are shrinking) is true, Newton iterate steps $\overline{h}_i$ may be used to change the potential convergence region being tested and each new range is evaluated for compliance with the Kantorovich condition at 1120, and if true, the range of parameterizing variable values associated with the range $\overline{x}_i$ changed by the Newton step (e.g., $\overline{h}_i$) is identified as the convergence region. If the Kantorovich condition 1120 does not hold true, then the range of values of the parameterizing variables $\overline{x}_p$ is sub-divided further at 1130 and the convergence( ) method 1100 is called on the sub-divisions recursively at 1140 for each of the sub-divisions.

The "while ($\overline{x}_i$ are shrinking)" condition at 1110 allows for Newton steps to be taken until some point when the steps become so small that any rounding errors related to the floating point calculation would actually start to grow the $\overline{x}_i$ range instead of shrinking it. The "while ($\overline{x}_i$ are shrinking)", however, is an exemplary condition. Other conditions may be used to determine how many Newton steps are to be taken and in which direction.

In one alternative, the subdivisions of ranges within parameterization regions which are called within methods the ConvergenceInRegion( ) 1000 and convergence( ) 1100 may be ½ divisions of such ranges determined during previous iterations. However, such subdivisions need not be restricted to dividing the previous ranges by half. Other divisions (e.g., ¼) may be used.

Exemplary Computing Environment

Figure 12:
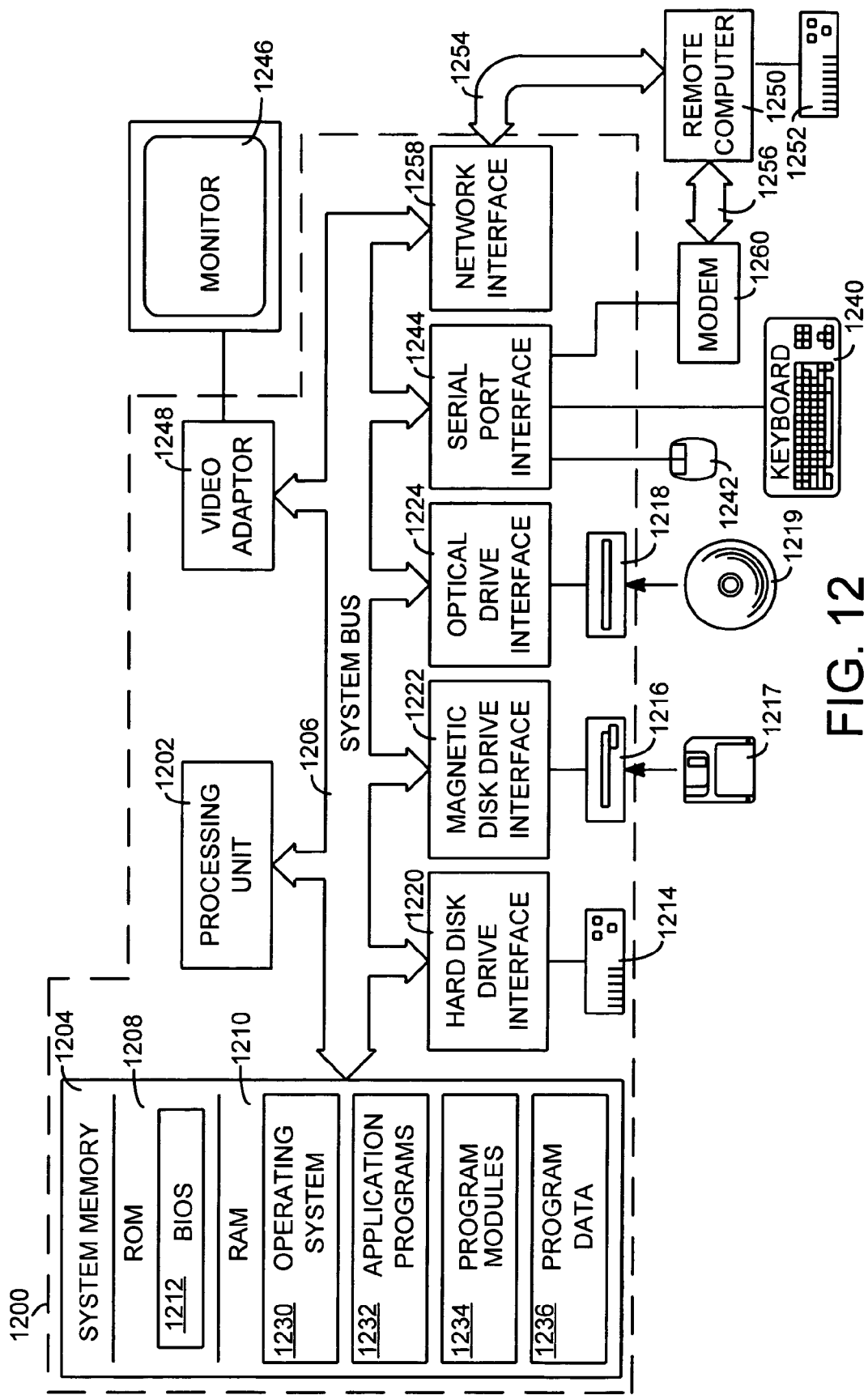
FIG. 12 is a diagram depicting a general-purpose computing device constituting an exemplary system for implementing the disclosed technology.

FIG. 12 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 12, an exemplary system for implementing the disclosed technology includes a general purpose computing device in the form of a conventional PC 1200, including a processing unit 1202, a system memory 1204, and a system bus 1206 that couples various system components including the system memory 1204 to the processing unit 1202. The system bus 1206 may be any of several types of bus structures including a memory bus or memory controller, a peripheral bus, and a local bus using any of a variety of bus architectures. The system memory 1204 includes read only memory (ROM) 1208 and random access memory (RAM) 1210. A basic input/output system (BIOS) 1212, containing the basic routines that help with the transfer of information between elements within the PC 1200, is stored in ROM 1208.

The PC 1200 further includes a hard disk drive 1214 for reading from and writing to a hard disk (not shown), a magnetic disk drive 1216 for reading from or writing to a removable magnetic disk 1217, and an optical disk drive 1218 for reading from or writing to a removable optical disk 1219 (such as a CD-ROM or other optical media). The hard disk drive 1214, magnetic disk drive 1216, and optical disk drive 1218 are connected to the system bus 1206 by a hard disk drive interface 1220, a magnetic disk drive interface 1222, and an optical drive interface 1224, respectively. The drives and their associated computer-readable media provide nonvolatile storage of computer-readable instructions, data structures, program modules, and other data for the PC 1200. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk 1214, magnetic disk 1217, optical disk 1219, ROM 1208, or RAM 1210, including an operating system 1230, one or more application programs 1232, other program modules 1234, and program data 1236. A user may enter commands and information into the PC 1200 through input devices such as a keyboard 1240 and pointing device 1242 (such as a mouse). Other input devices (not shown) may include a digital camera, microphone, joystick, game pad, satellite dish, scanner, or the like. These and other input devices are often connected to the processing unit 1202 through a serial port interface 1244 that is coupled to the system bus 1206, but may be connected by other interfaces such as a parallel port, game port, or universal serial bus (USB). A monitor 1246 or other type of display device is also connected to the system bus 1206 via an interface, such as a video adapter 1248. Other peripheral output devices, such as speakers and printers (not shown), may be included.

The PC 1200 may operate in a networked environment using logical connections to one or more remote computers, such as a remote computer 1250. The remote computer 1250 may be another PC, a server, a router, a network PC, or a peer device or other common network node, and typically includes many or all of the elements described above relative to the PC 1200, although only a memory storage device 1252 has been illustrated in FIG. 12. The logical connections depicted in FIG. 12 include a local area network (LAN) 1254 and a wide area network (WAN) 1256. Such networking environments are commonplace in offices, enterprise-wide computer networks, intranets, and the Internet.

When used in a LAN networking environment, the PC 1200 is connected to the LAN 1254 through a network interface 1258. When used in a WAN networking environment, the PC 1200 typically includes a modem 1260 or other means for establishing communications over the WAN 1256, such as the Internet. The modem 1260, which may be internal or external, is connected to the system bus 1206 via the serial port interface 1244. In a networked environment, program modules depicted relative to the personal computer 1200, or portions thereof, may be stored in the remote memory storage device. The network connections shown are exemplary, and other means of establishing a communications link between the computers may be used.

Alternatives

Having described and illustrated the principles of our invention with reference to the illustrated embodiments, it will be recognized that the illustrated embodiments can be modified in arrangement and detail without departing from such principles.

For instance, many of the examples used above describe algorithms for determining implicit curves of intersection of two or more procedural surfaces with known functions. However, the principles described herein may be applied to any implicitly defined functions. For instance, these same principles may be applied to motion in a machine with different functions defining different motions of different parts of machine which may need to be synchronized.

Furthermore, many of the examples illustrate functions wherein parametrization functions show a $R^4 \rightarrow R^3$ domain to range transformation indicating that a single parameterizing variable parameterizes the expression of the dependent variables. However, other transformations are possible. For instance, two parameterizing variables may be chosen to parameterize the expression of the rest of the variables as dependent variables.

In addition to representing implicit curves, the principles described herein may be applied equally effectively to calculate compact piecewise parametric inverses of arbitrary functions and to compute exact efficient representations of arbitrary differentiable functions.

Furthermore, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims.

Also, the alternatives specifically addressed in this sections are merely exemplary and do not constitute all possible alternatives to the embodiments described herein.

I claim:

1. A computer implemented method for generating a parameterized representation of an implicit function, the method comprising:

receiving a definition of one or more parameterization regions related to one or more parameterizing variables of the implicit function wherein the parameterization regions for at least one of the one or more parameterizing variables are based on a non-singularity property associated with a dependent derivative matrix related to a corresponding one of the one or more parameterizing variables;

selecting a first range of values of the one or more parameterizing variables of the one or more parameterizing regions for applying an intervalized super convergence test, wherein applying the intervalized super convergence test comprises determining whether the selected range satisfies a Kantorovich condition;

continuing to select subsequent ranges of values of the parameterizing variables for applying the intervalized super convergence test by sub-dividing the one or more parameterizing regions for a selected number of iterations or until the intervalized super convergence test is satisfied; and generating the parameterized representation of the implicit function based on one or more ranges of values of the one or more parameterizing variables that satisfy the intervalized super convergence test.

2. The method of claim 1, wherein the implicit function defines a curve of intersection between at least two graphical objects.

3. The method of claim 1, wherein the first range of values of the one or more parameterizing variables of the one or more parameterizing regions for applying the intervalized super convergence test is an entire range of the one or more parameterizing regions.

4. The method of claim 1 further comprising determining new starting points corresponding to each of the iteratively selected ranges of values of the parameterizing variables for applying the intervalized super convergence test.

5. The method of claim 1, wherein continuing to select subsequent ranges of values of the parameterizing variables by sub-dividing the one or more parameterizing regions comprises iteratively applying Newton iterate steps to the ranges of values of the parameterizing variables selected for applying the intervalized super convergence test.

6. A computer system for processing data related to procedural representations of graphical objects to render implicit curves of intersection based on the graphical objects by generating a parameterized representation of one or more of the implicit curves of intersection, the computer system comprising:
- a processor; and
- a memory containing programming to be executed by the processor for an implicit curve representation generator wherein the implicit curve representation generator is operable for:
- receiving function definitions of at least two of the graphical objects;
- determining one or more parameterization regions for one or more of the implicit curves of intersection based on the functions defining the at least two graphical objects by determining a non-singularity property of at least one dependent derivative matrix related to one or more of the parameterizing variables;
- applying an intervalized super convergence test to selected ranges of parameterizing variables of the one or more parameterization regions, wherein the ranges of the parameterizing variables are selected based on continuing to iteratively sub-divide previously selected ranges of the parameterizing variables until at least one range of at least one parameterizing variable satisfies the intervalized super convergence test, and wherein the intervalized super convergence test comprises determining whether the ranges selected for testing super convergence satisfy the Kantorovich condition; and
- generating the parameterized representation of the one or more of the implicit curves of intersection comprising a representation of the at least one range of the at least one parameterizing variable that has satisfied the intervalized super convergence test.

7. The system of claim 6, wherein the implicit curve representation generator is further operable for selecting at least some of the one or more parameterization regions as the ranges of the parameterizing variables selected for applying the intervalized super convergence test.

8. The system of claim 6, wherein the implicit curve representation generator is further operable for determining new starting points corresponding to each of the iteratively selected ranges of values of the parameterizing variables for applying the intervalized super convergence test.

9. The system of claim 6, wherein the implicit curve representation generator is further operable for applying Newton iterate steps to change the selected ranges of values of the parameterizing variable for applying the intervalized super convergence test.

10. The system of claim 6, wherein the sub-dividing comprises dividing the selected ranges by half.

11. At least one computer-readable medium having stored thereon computer-executable instructions for performing a method of generating parameterized representation of an implicit curve of intersection related to procedural representations of graphical objects, the method comprising:
- receiving function definitions of at least two of the graphical objects;
- based on the functions defining the at least two graphical objects, determining one or more parameterization regions for an implicit function related to the implicit curve of intersection by determining a non-singularity property of at least one dependent derivative matrix related to the one or more parameterizing variables over the one or more parameterization regions;
- applying an intervalized super convergence test to selected ranges of parameterizing variables of the one or more parameterization regions, wherein the selected ranges of the parameterizing variables are calculated based on iteratively sub-dividing previously selected ranges of the parameterizing variables until at least one range of at least one parameterizing variable satisfies the intervalized super convergence test, and wherein the intervalized super convergence test comprises determining whether the ranges selected for testing super convergence satisfy the Kantorovich condition; and
- using the at least one range of the at least one parameterizing variable that has satisfied the intervalized super convergence test to generate a parameterized representation of the implicit curve of intersection to be used for rendering an image comprising the implicit curve of intersection.

12. The computer readable medium of claim 11 further comprising instructions for determining new starting points corresponding to each of the iteratively selected ranges of the parameterizing variables for applying the intervalized super convergence test.

13. The computer readable medium of claim 11 further comprising instructions for applying Newton iterate steps to change the selected ranges of values of the parameterizing variables for applying the intervalized super convergence test.

14. The computer readable medium of claim 11, wherein the sub-dividing of the selected ranges of the parameterizing variables comprises dividing the selected ranges of the parameterizing variables by half.

15. The computer readable medium of claim 11 further comprising instructions for selecting at least some of the one or more parameterization regions as the ranges of the parameterizing variables selected for applying the intervalized super convergence test.

* * * * *